United States Patent
Dix et al.

(10) Patent No.: US 11,669,081 B2
(45) Date of Patent: Jun. 6, 2023

(54) DATA PROCESSING DEVICE CAPABLE OF PERFORMING PROBLEM DIAGNOSIS IN A PRODUCTION SYSTEM WITH PLURALITY OF ROBOTS AND METHOD

(71) Applicant: ABB Schweiz AG, Baden (CH)

(72) Inventors: Marcel Dix, Mannheim (DE); Boris Fiedler, Wiesbaden (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/996,928

(22) Filed: Aug. 19, 2020

(65) Prior Publication Data

US 2021/0034047 A1    Feb. 4, 2021

Related U.S. Application Data

(63) Continuation of application No. PCT/EP2018/081202, filed on Nov. 14, 2018.

(30) Foreign Application Priority Data

Feb. 22, 2018  (EP) .................................... 18158091

(51) Int. Cl.
    *G05B 23/02*    (2006.01)
(52) U.S. Cl.
    CPC ....... *G05B 23/0235* (2013.01); *G05B 23/027* (2013.01); *G05B 23/0229* (2013.01)
(58) Field of Classification Search
    CPC ............ G05B 23/0235; G05B 23/0229; G05B 23/027

(Continued)

(56) References Cited

U.S. PATENT DOCUMENTS

| 2014/0055274 A1* | 2/2014 | Hatch ...................... G01H 1/00 |
| | | 702/183 |
| 2016/0279794 A1* | 9/2016 | Inagaki ................. B25J 9/1674 |
| 2017/0031329 A1* | 2/2017 | Inagaki ................. G05B 15/02 |

FOREIGN PATENT DOCUMENTS

| CN | 106802643 A | 6/2017 |
| WO | WO 2014/043623 A1 | 3/2014 |

OTHER PUBLICATIONS

China National Intellectual Property Administration, Office Action in Chinese Patent Application No. 201880090073.0, 22 pp. (dated Feb. 23, 2023).

* cited by examiner

*Primary Examiner* — Jigneshkumar C Patel
(74) *Attorney, Agent, or Firm* — Leydig, Voit & Mayer, Ltd.

(57) ABSTRACT

A data processing device capable of performing problem diagnosis in a production system with a plurality of robots includes: a first time series obtaining part for obtaining historical event data used for determining some historical alarm indicator in time series and storing the historical event data as first time series data; a historic alarm indicator calculation part for calculating a series of historic alarm indicators using statistic characteristics of the first time series data; a threshold definition part for defining at least one threshold value based on a statistical distribution of the historical alarm indicators; a second time series obtaining part for obtaining operational event data during operation of the robots used for determining some operational alarm indicator in time series and storing the operational event data as second time series data; and an operational alarm indicator calculation part for calculating a series of operational alarm indicators.

18 Claims, 3 Drawing Sheets

(58) Field of Classification Search
USPC .......................................................... 700/80
See application file for complete search history.

DATA PROCESSING DEVICE CAPABLE OF PERFORMING PROBLEM DIAGNOSIS IN A PRODUCTION SYSTEM WITH PLURALITY OF ROBOTS AND METHOD

CROSS-REFERENCE TO PRIOR APPLICATION

This application is a continuation of International Patent Application No. PCT/EP2018/081202, filed on Nov. 14, 2018, which claims priority to European Patent Application No. EP 18158091.1, filed on Feb. 22, 2018. The entire disclosure of both applications is hereby incorporated by reference herein.

FIELD

The invention is about a data processing device capable of performing problem diagnosis in a production system with a plurality of robots.

BACKGROUND

The invention is further about a method for performing unsupervised diagnosis in a production system with a plurality of robots.

In a production line, an industrial robot is used together with a number of other robots or machines. In many applications, large number of industrial robots are installed in one site. Thus, even when only one robot fails to operate properly, the whole production line may be terminated. Therefore, there is a need for means to detect problems occurring at a robot in a production line with a plurality of robots that may lead to malfunction of the robot early enough to prevent the halt of the production line.

Detecting problems in a robot as part in a large fleet of robots is not an easy task. Not always are problems visible to the operators in the line—for instance synchronization problems might call delays of a couple of seconds that are unnoticed, but add-up to a serious problem if they keep on occurring for a longer time.

One source of information to monitor a robot is the event log, that each robot produces during operation in production. But analysis of the raw event logs is a very tedious task and does not scale. Event data are monitored for each robot in a dashboard, so there are at least as many dashboards of robot event data as there are robots in the line, which makes it nearly impossible for an operator to monitor or analyze these data.

SUMMARY

In an embodiment, the present invention provides a data processing device capable of performing problem diagnosis in a production system with a plurality of robots, comprising: a first time series obtaining part configured to obtain historical event data used for determining some historical alarm indicator in time series and to store the historical event data as first time series data; a historic alarm indicator calculation part configured to calculate a series of historic alarm indicators using statistic characteristics of the first time series data; a threshold definition part configured to define at least one threshold value based on a statistical distribution of the historical alarm indicators; a second time series obtaining part configured to obtain operational event data during operation of the robots used for determining some operational alarm indicator in time series and to store the operational event data as second time series data; an operational alarm indicator calculation part configured to calculate a series of operational alarm indicators using statistic characteristics of the second time series data; an alarm notification part configured to give alarm notifications to one of operational, maintenance, or troubleshooting personnel for alarm indicators above the at least one threshold level; and an event highlighting part configured to highlight to one of the operational, maintenance, or troubleshooting personnel the events that mainly contribute to the operational alarm indicator, in order to determine the events that mainly contribute to the operational alarm indicator.

BRIEF DESCRIPTION OF THE DRAWINGS

The present invention will be described in even greater detail below based on the exemplary figures. The invention is not limited to the exemplary embodiments. The attached new drawing sheet presents additional FIG. 3 Other features and advantages of various embodiments of the present invention will become apparent by reading the following detailed description with reference to the attached drawings which illustrate the following.

DETAILED DESCRIPTION

Figure 1:
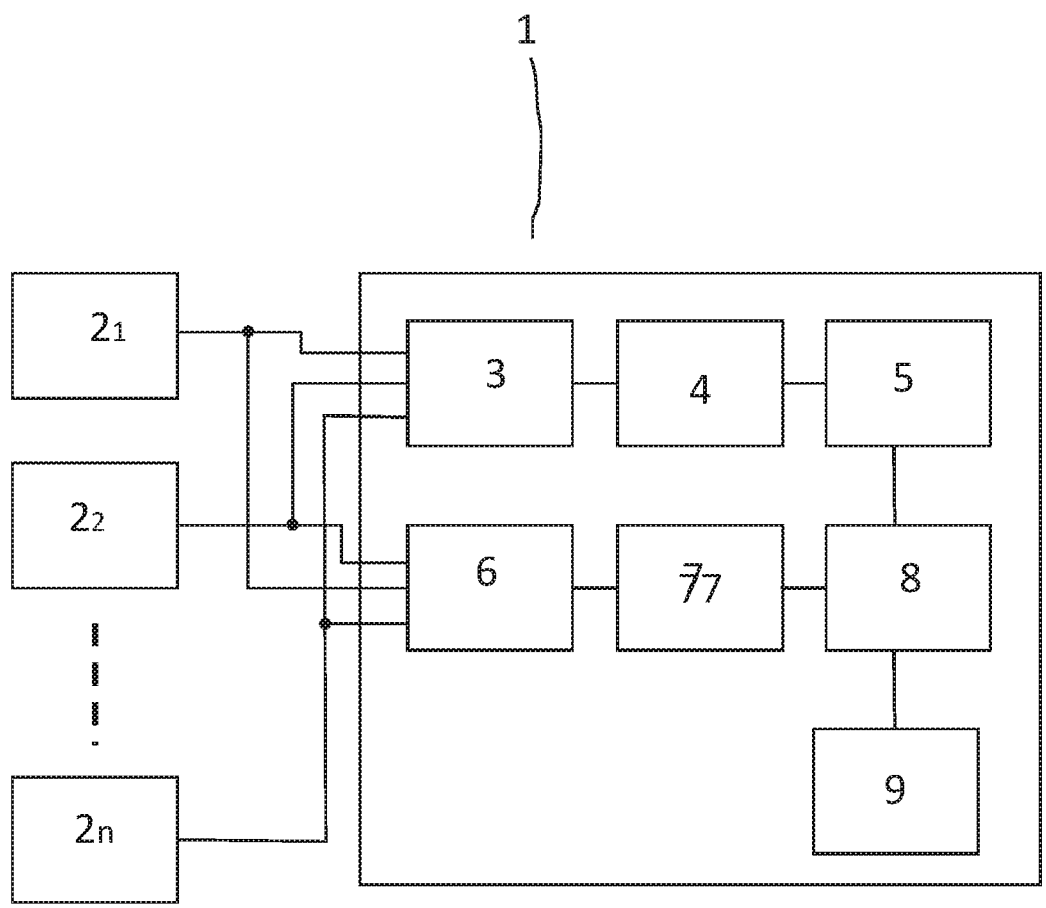
FIG. 1 is a functional block diagram of a data processing device capable of performing problem diagnosis in a plurality of robots according to one embodiment.

In an embodiment, the present invention provides a data processing device and a method capable of performing problem diagnosis in a plurality of robots that allows to realize an alarm system to perform fault diagnosis of one or more robots in a fleet of a plurality of robots, that allows for an algorithmic analysis of the log-files of the robots without large engineering effort, and which reduces the complexity of monitoring information to a degree that can be processed by a human operator.

The problem is solved with respect to the device according to the invention by a data processing device as described herein.

The problem is solved with respect to the method according to the invention by a method as described herein.

A data processing device according to the invention comprises a first time series obtaining part configured to obtain historical event data used for determining some historical alarm indicator in time series and store the historical event data as first time series data, a historic alarm indicator calculation part configured to calculate a series of historic alarm indicators $a_{i,h}$ using statistic characteristics of the first time series data, a threshold definition part configured to define at least one threshold value based on the statistical distribution of the historical alarm indicators, a second time series obtaining part configured to obtain operational event data during operation of the robots used for determining some operational alarm indicator $a_i$ in time series and store the operational event data as second time series data, an operational alarm indicator calculation part configured to calculate a series of operational alarm indicators $a_i$ using statistic characteristics of the second time series data, an alarm notification part configured to give alarm notifications to one of operational, maintenance or troubleshooting personnel for alarm indicators above the at least one threshold level, an event highlighting part configured to highlight to one of operational, maintenance or troubleshooting personnel the events that mainly contribute to the operational alarm indicator $a_i$, in order to determine the events that mainly contribute to the operational alarm indicator $a_i$.

The solution according to the present invention is an algorithmic analysis of the log files that highlights robots that require attention. It derives an alarm logic from historical event data, provides alarms and additional diagnostics information about the type of problem without human intervention.

The data processing device according to the invention provides high level alarm logic robust to single nuisance alarms without the need to manually define or tune alarm thresholds.

It further provides an automatic overview of 'hot-areas' both in production structure, i.e. for example line or cell, and technical nature of the problems, i.e. for example application specific, communication, mechanical . . . .

The invention provides a generic approach to monitoring dashboards based on robot event data.

FIG. 1 is a functional block diagram of a data processing device 1 capable of performing problem diagnosis in a plurality of robots $2_1$, $2_2$, $2_n$ according to one embodiment. The data processing device 1 is communicatively coupled to a plurality of robots $2_1$, $2_2$, $2_n$ in a production line or an industrial process. The robots $2_1$, $2_2$, $2_n$ are not illustrated in detail but may be known multiple-joint robots provided with a plurality of motors for driving joints, and provided with a robot controller each or a robot control unit for controlling a plurality of robots together. The data processing device 1 may be a device on its own functionally and communicatively coupled to each of the robots $2_1$, $2_2$, $2_n$, receiving information from the respective robot control units, or it may be a functional part of a general robot control unit for controlling the robots. The data processing device 1 may be realized as a software program, either running on its own or as a program module of the robot control and monitoring software.

The data processing device 1 comprises a first time series obtaining part 3 configured to obtain historical event data used for determining some historical alarm indicator in time series and store the historical event data as first time series data. It further comprises a historic alarm indicator calculation part 4 configured to calculate a series of historic alarm indicators $a_{i,h}$ using statistic characteristics of the first time series data. It further comprises a threshold definition part 5 configured to define at least one threshold value based on the statistical distribution of the historical alarm indicators. It further comprises a second time series obtaining part 6 configured to obtain operational event data during operation of the robots $2_1$, $2_2$, $2_n$ used for determining some operational alarm indicator $a_i$ in time series and store the operational event data as second time series data. It further comprises an operational alarm indicator calculation part 7 configured to calculate a series of operational alarm indicators $a_i$ using statistic characteristics of the second time series data. It further comprises an alarm notification part 8 configured to give alarm notifications to one of operational, maintenance or troubleshooting personnel for alarm indicators above the at least one threshold level. It further comprises an event highlighting part 9 configured to highlight to one of operational, maintenance or troubleshooting personnel the events that mainly contribute to the operational alarm indicator $a_i$, in order to determine the events that mainly contribute to the operational alarm indicator ($a_i$).

Each of the first time series obtaining part 3, historic alarm indicator calculation part 4, threshold definition part 5, second time series obtaining part 6, operational alarm indicator calculation part 7, alarm notification part 8, and event highlighting part 9 may be realized as program modules of the robot control and monitoring software.

Figure 2:
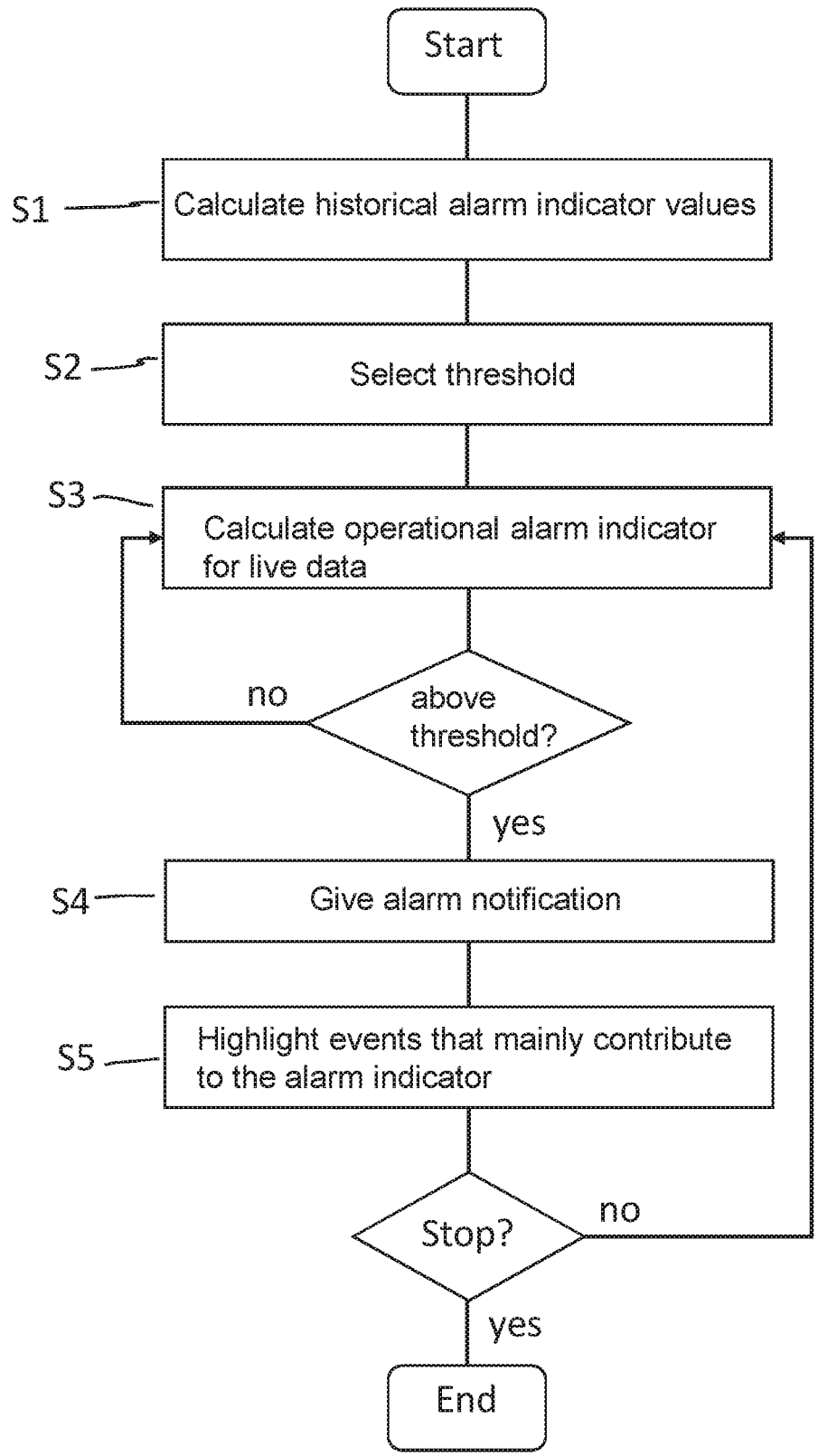
FIG. 2 is a flow chart showing the process performed by a data processing device capable of performing problem diagnosis in a plurality of robots according to one embodiment

The overall process as executed by the data processing device 1 is depicted with reference to FIG. 2.

In an initial step S, some historic alarm indicator values are calculated based on historical data. The historic alarm indicator can be defined for time-windows, e.g. hours or days, or alarm episode, e.g. chunk of events with less than 5 minutes between the subsequent events.

Based on the distribution of the historic alarm indicator values, a threshold value is defined and selected in the following step S2.

In the next step S3, during live operation, new event data is used to calculate an operational alarm indicator. The operational alarm indicator calculation part 4 may for this purpose use the same algorithm as is used in the historic alarm indicator calculation part 7.

For values above the threshold, in step S4 alarm notifications are given to operational, maintenance, or troubleshooting personal.

In a further step S5, the events that mainly contribute to the operational alarm indicator are highlighted to the operational, maintenance or troubleshooting personal.

The basic idea of the invention is to use statistic characteristic of the event log to calculate an alarm indicator ($a_i$).

For instance, the alarm indicator for one day could be calculated by:

$$ai = \frac{|x' - \bar{x}| - \sigma}{|x' - \bar{x}|}$$

With
x'=numbers event in an observation period (day, hour)
$\bar{x}$=average number of events
σ=standard deviations in number of events The $a_i$ captures, how much of the current number of the events deviating from the average can be accounted for the standard deviation and how much is uncommon. Based on the statistical distribution of $a_i$ in the historical data, one or several threshold values can be defined, e.g.:
ai>0.3=>yellow alarm
ai>0.5=>orange alarm
ai>0.8=>red alarm The values could be for instance the 0.75; 0.85 and 0.95 percentile of the distribution of ai.

The parameters of the ai are determined in an initial training step on historical data.

At runtime, new 'chunks' of incoming events are used to calculate an updated value for the alarm indicator ai. If ai is above the threshold, an alarm with all relevant information, e.g. production line, cell, robot, are displayed to the monitoring personnel.

Furthermore, additional information highlighting the current condition of the robot/line/cell are provided. Such additional information may comprise:

A list of events that cause the high value of ai, e.g. unlikely events, uncommon frequent events, missing events and so on, or a visualization of the alarm indicator in a hierarchal fashion, e.g. visualizing how much ai is caused by one line/cell/robot, how much ai is caused by what category of event, which category of event may be one of communication, tool, application, electrical, etc.

Other examples of alarm indicators can be:

Based on the frequency of overall events, event categories, or single events;

Based on distance to k-th nearest neighbors using some distance or similarity measure like cosine, jacquard, Euclidian or other;

Error rates of machine learning algorithms like autoencoder networks, regression algorithms, bayes classifier or others;

Based on event probabilities and likelihoods, e.g., estimated by kernel density estimation A further advantageous embodiment can be the combination of a machine learning algorithm, e.g. once-class-svm, knn anomaly detection, local-outlier-factor, autoencoder networks, to detect anomalies in the event data and an alarm indicator to identify the events that probably cause the decision of the machine learning algorithms towards anomaly.

A further advantageous embodiment may be an integration into a—e.g. state-based or event based—alarm system. Such an alarm system, in case it is state-based, will trigger an alarm while the score is above a threshold. In case it is event-based, it will trigger an alarm when the alarm exceeds a threshold.

A further advantageous embodiment may be to include arbitrary input data like I/O or analog signals.

Input for the calculation of alarm Key Performance Indicators (KPIs) is the log file of the robots or production system. Below is an example of a log file produced by one or several robots. The example log file has the attributes category and message. A log file can have more attributes, like several message arguments or event severity.

| Row | Timestamp | Category | Message |
|---|---|---|---|
| 1 | 2018 Jun. 8 07:08:34 | Motion | Motion Message |
| 2 | 2018 Jun. 8 07:08:35 | Communication | Communication Message |
| 3 | 2018 Jun. 8 07:08:33 | Motion | Motion Message |
| 4 | 2018 Jun. 8 07:08:35 | Controller | Controller Message |
| 5 | 2018 Jun. 8 07:08:39 | Communication | Communication Message |
| 6 | ... | ... | ... |
| n | 2019 Jan. 2 14:22:42 | Communication | Communication Message |
| n + 1 | 2019 Jan. 2 14:22:43 | Controller | Controller Message |
| n + 2 | 2019 Jan. 2 14:24:09 | Motion | Motion Message |
| n + 3 | 2019 Jan. 2 14:25:34 | Communication | Communication Message |

Example 1

This example how to calculate an alarm indicator based on the number of events in a specified time-slot. Input is the historical time-series as shown in the table above with vents from one or several robots. The robot event are have different categories, e.g. motion (e.g. collision event, path executed), communication (e.g. I/O status change, I/O card missing), controller (e.g. backup, high temperature) depending on the source of the event documented in the log. In a first step, the number of events per hour is calculated. For ten hours the results in the following number per hour:

| | Motion | Communication | Controller | Total |
|---|---|---|---|---|
| 1 | 66 | 45 | 39 | 150 |
| 2 | 86 | 5 | 5 | 96 |
| 3 | 68 | 1 | 3 | 72 |
| 4 | 108 | 45 | 16 | 169 |
| 5 | 120 | 17 | 9 | 146 |
| 6 | 64 | 35 | 50 | 149 |
| 7 | 119 | 7 | 29 | 155 |
| 8 | 73 | 6 | 5 | 84 |
| 9 | 60 | 1 | 41 | 102 |

The following tables show the average and standard deviation for the total number of events and the number of event in each category:

| | Motion | Communication | Controller | Total |
|---|---|---|---|---|
| Average | 84,88889 | 18 | 21,888889 | 124,7778 |
| STD | 24,42051 | 18,57417562 | 18,120737 | 35,94711 |

An alarm KPI can be calculated by the formula:

$$\begin{cases} 1, \text{ if } |\bar{x} - x| < \sigma \\ 1 - \dfrac{||\bar{x} - x| - \sigma|}{|\bar{x} - x|}, \text{else} \end{cases}$$

with $\bar{x}$ as the average number of total alarms, x the number of alarms in the hour and $\sigma$ the standard deviation of alarm per hour, resulting in the following alarm indicator for the 10 hours:

| | AI |
|---|---|
| 1 | 1 |
| 2 | 1 |
| 3 | 0,681103 |
| 4 | 0,812874 |
| 5 | 1 |
| 6 | 1 |
| 7 | 1 |
| 8 | 0,881537 |
| 9 | 1 |

The 10% percentile for AI is 0.68, the 25% percentile is 0.85 and the 0.75 percentile is 1. This can be used to define the following alarm thresholds:

| Decision Threshold | |
|---|---|
| AI > 0.75 | Status green, show no alarm |
| 0.75 > AI > 0.68 | Status yellow, show yellow alarm |
| 0.68 > AI | Status red, show red alarm |

Assuming that different categories of events exists like motion event, tool events, controller events additional information can be provided about the main contributors to events. The contribution can be for instance calculated by applying the alarm indicator formula to the event categories.

During operation, the event generated during the last 60 minutes are collected from the robot and the alarm indicator is calculated. Assuming the following two example hours:

|   | Motion | Communication | Controller | Total |
|---|--------|---------------|------------|-------|
| A | 80     | 20            | 35         | 135   |
| B | 50     | 0             | 15         | 65    |

The events in hour A result in an alarm indicator is $AI_A=0.61$ and thus will not trigger an alarm. The events in hour B result in an alarm indictor $AI_B=0.6$ and will result in showing a red-alarm. Furthermore, the alarm indicator for hour B per category are $AI_{B,motion}=0.7$ and $AI_{B,communication}=1$ and $AI_{B,controller}=1$ implying that a possible issue is related to the motion of the robot.

Example 2

This example shows how a machine learning model can be used to calculate and alarm KPI. Input is again the historical logfile of one or several robots. The log file table is transformed into samples for a decision tree classification:

| Row from original table | Event Category | Category $1^{st}$ event before | Category $2^{nd}$ event before |
|---|---|---|---|
| 3 | Motion | Communication | Motion |
| 4 | Controller | Motion | Communication |
| 5 | Communication | Controller | Motion |
| ... | | | |

Where event category is the category of an event from the event log, category $1^{st}$ event before is the category of the event one row before the event, and category $2^{nd}$ event is the category of the event two rows before the event. Each row (beside the 'row from original table' column) is used as one sample for a decision tree training, where the decision tree is trained to predict the category of the event when knowing the category of the $1^{st}$ event and $2^{nd}$ event before. This is a typical classification problem in machine learning.

Figure 3:
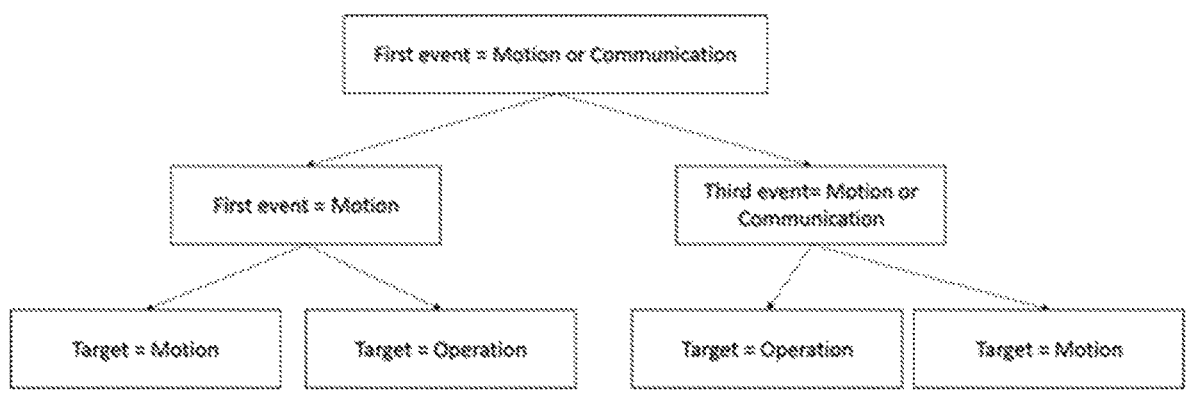
FIG. 3 shows an example of a decision tree output.

FIG. 3 shows an example of a decision tree output. Following the criteria in the leaves of the tree, one reaches to the prediction of the tree. When making predictions, the decision tree will make correct and incorrect predictions. On the historical data, the decision tree might make 90% correct predictions. During the online phase, the decision tree is used to predict events in the incoming stream of data. If the decision trees correct prediction rates drops e.g., over an hour below a first threshold (e.g. 70%), as yellow alarm is generated. If the prediction e.g. over an hour below 50%, a red alarm is generated.

Other machine learning model might use regression or probability estimations (e.g. kernel density estimation) and their output to derive an alarm indicator.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

| 1 | Processing device |
|---|---|
| $2_1, 2_2, 2_n$ | robot |
| 3 | time series obtaining part |
| 4 | historic alarm indicator calculation part |
| 5 | threshold definition part |
| 6 | second time series obtaining part |
| 7 | operational alarm indicator calculation part |
| 8 | alarm notification part |
| 9 | event highlighting part |
| $a_j$, h | historic alarm indicators |
| $a_j$ | operational alarm indicators |
| S1 | Step 1 |
| S2 | Step 2 |
| S3 | Step 3 |
| S4 | Step 4 |
| S5 | Step 5 |
| S6 | Step 6 |
| S7 | Step 7 |

What is claimed is:

1. A data processing device capable of performing problem diagnosis in a production system with a plurality of robots, comprising:
 a controller configured to:
  obtain historical event data used for determining some historical alarm indicator in time series and to store the historical event data as a first time series data;
  calculate a series of historic alarm indicators using statistic characteristics of the first time series data;
  define at least one threshold value based on a statistical distribution of the historical alarm indicators;
  obtain operational event data during operation of the robots used for determining some operational alarm indicator in time series and to store the operational event data as a second time series data;
  calculate a series of operational alarm indicators using statistic characteristics of the second time series data;
  give alarm notifications to one of operational, maintenance, or troubleshooting personnel for alarm indicators above the at least one threshold level; and
  highlight to one of the operational, maintenance, or troubleshooting personnel the events that mainly contribute to the operational alarm indicator by:
   highlighting a robot from the plurality of robots, associated with the operational alarm indicator that exceeded the at least one threshold; and
   selecting additional information related to the highlighted robot that includes the current condition of the highlighted robot, and a list of events that caused the highlighted robot to exceed the threshold.

2. The data processing device according to claim 1, wherein the controller is further configured to:
execute a machine learning algorithm in order to detect anomalies in the event data, wherein the event data comprises the historical event data and operational event data; and
identify events that probably cause a decision of the machine learning algorithm towards anomaly.

3. The data processing device according to claim 1, wherein the controller is further configured to include arbitrary input data comprising I/O or analog signals as event data.

4. A state-based or event based alarm system, comprising:
the data processing device according to claim 1, which is configured, when state-based, to trigger an alarm while a score is above a threshold, and when event-based, to trigger an alarm when the alarm exceeds a threshold.

5. The data processing device according to claim 1, wherein the controller is configured to obtain historical event data in the first time series by collecting historic alarm indicators in a pre-defined window of time.

6. The data processing device according to claim 1, wherein the controller is configured to give alarm notifications by:
calculating a difference between the obtained operational event data from the second time series data and at least one threshold value; and
generating a first kind of alarm based on the calculated difference.

7. The data processing device according to claim 1, wherein the respective statistic value for each respective historic alarm indicator in the series of historic alarm indicators is generated based on the statistic characteristics of the first time series data corresponding to the respective number of events in the historical event data in the respective observation period.

8. The data processing device according to claim 1, wherein the respective statistic value for each respective operational alarm indicator in the series of operational alarm indicators is generated based on the statistic characteristics of the second time series data corresponding to the respective number of events in the operational event data in the respective observation period.

9. The data processing device according to claim 1, wherein the respective historic alarm indicator of the series of historic alarm indicators corresponding to the respective observation period is calculated by:

$$ai = \frac{|x' - \bar{x}| - \sigma}{|x' - \bar{x}|}$$

wherein $x'$ is the respective number of events in the respective observation period, $\bar{x}$ is an average number of events, and $\sigma$ is a standard deviation in number of events,
wherein the at least one threshold level comprises a first threshold level set to be satisfied when ai is above a first value, a second threshold level set to be satisfied when ai is above a second value, the second value being higher than the first value, and a third threshold level set to be satisfied when ai is above a third value, higher than the second value.

10. The data processing device according to claim 1, wherein each historic alarm indicator is a respective statistic value over a number of events in the historical event data in a respective observation period.

11. The data processing device according to claim 10, wherein each operational alarm indicator is a respective statistic value over a number of events in the operational event data in a respective observation period.

12. A method for performing unsupervised diagnosis in a production system with a plurality of robots, the method comprising steps of:
S1: calculating historic alarm indicator values based on historical data, wherein each historic alarm indicator is a respective statistic value over a number of events in the historical event data in a respective observation period;
S2: defining and selecting a threshold value based on the distribution of the historic alarm indicator values;
S3: calculating an operational alarm indicator during live operation, using new event data, wherein each operational alarm indicator is a respective statistic value over a number of events in the operational event data in a respective observation period;
S4: giving alarm notifications for values above the threshold value, to operational, maintenance, or troubleshooting personnel; and
S5: highlighting to the operational, maintenance, or troubleshooting personnel the events that mainly contribute to the operational alarm indicator by:
highlighting a robot from the plurality of robots, associated with the operational alarm indicator that exceeded the at least one threshold; and
selecting additional information related to the highlighted robot that includes the current condition of the highlighted robot, and a list of events that caused the highlighted robot to exceed the threshold.

13. The method according to claim 12, further comprising steps of:
S6: running a machine learning algorithm to detect anomalies in the event data, wherein the event data comprises the historical event data and operational event data; and
S7: running an alarm indicator algorithm to identify the events that probably cause a decision of the machine learning algorithm towards anomaly.

14. The method according to claim 12, wherein the event data further comprises arbitrary input data comprising I/O or analog signals.

15. The method according to claim 12, wherein calculating the series of historic alarm indicator values is performed by collecting historic alarm indicators in a pre-defined window of time.

16. The method according to claim 12, wherein giving alarm notifications for values above the threshold value further comprises:
calculating a difference between the operational event data from the second time series data and at least one threshold value; and
generating a first kind of alarm based on the calculated difference.

17. The method according to claim 12, wherein each historic alarm indicator is a respective statistic value over a number of events in the historical event data in a respective observation period.

18. The method according to claim 17, wherein each operational alarm indicator is a respective statistic value over a number of events in the operational event data in a respective observation period.

\* \* \* \* \*